A. J. KLONECK.
SAFETY BRAKE APPARATUS FOR VEHICLES.
APPLICATION FILED SEPT. 23, 1914.
1,275,702.
Patented Aug. 13, 1918.
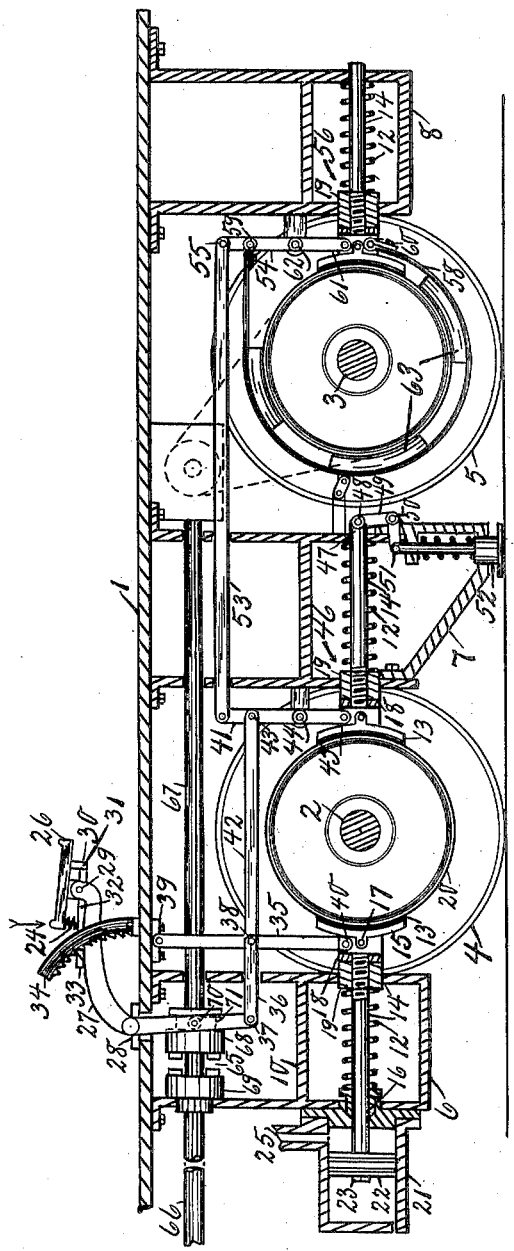
WITNESSES:
Friedrich Scherzer.
Ernst Boettcher.
INVENTOR.
August J. Kloneck.

UNITED STATES PATENT OFFICE.

AUGUST J. KLONECK, OF NEW YORK, N. Y.

SAFETY BRAKE APPARATUS FOR VEHICLES.

1,275,702.  Specification of Letters Patent.  Patented Aug. 13, 1918.

Application filed September 23, 1914. Serial No. 863,152.

*To all whom it may concern:*

Be it known that I, AUGUST J. KLONECK, a citizen of the United States, residing at New York, in the county and State of New York, have invented new and useful Improvements in Safety Brake Apparatus for Vehicles, of which the following is a specification.

This invention relates to an improved method of and apparatus for automatically braking various vehicles which invention is particularly useful for railroad cars, street cars and automobiles and generally in connection with any vehicle.

The object of the invention is to provide a spring operated brake and to attach the same to a vehicle in a manner, so as to brake and stop a vehicle without the aid of an associated power in case of destruction of any part of the control for the driver, thus preventing an accident under all conditions.

A further object of the invention is to combine the brake apparatus with the propelling supply of the vehicle; whereby the application of the brake causes accordingly to disengage the propelling supply to the vehicle.

The invention consists in the construction, and combination and arrangement of parts hereinafter described and more specifically pointed out in the appended claims.

The illustrated figure shows a longitudinal section of a portion of a car in connection with my invention.

Referring to the drawing wherein similar characters of reference indicate similar parts in the view, the numeral 1 designates a portion of the frame of a car which rests upon the axles 2 and 3 of the wheels 4 and 5. The art of attaching the wheels to the car may be as convenient and is not essential for this invention.

Mounted upon the frame 1 and extending toward the wheels are suitable hangers 6, 7 and 8, carrying the brake apparatus, which may conventionally be inclosed in a housing 10. The brake apparatus consists of a spiral spring 12, brake shoe 13 and rod 14, the latter is movable in suitable openings 15, 16 of the housing 10 and connected with the brake shoes 13 by means of pins 17 or in any other convenient manner. Adjustable nuts 18, 19 are provided upon the threaded portion of the brake rods 14 for the purpose to modify the friction of the brake shoes against the wheels of the car or preferably against a brake drum 20, attached to the latter. Spring 12 is arranged in a manner, so as to press the brake shoe against the brake drum, normally applying brake to the vehicle.

For the purpose to release the brake and to permit the car to travel, means are provided to disengage the brake shoes from the drum 20. Such disengagement may be accomplished in various manners as electrically, by hand power or otherwise; and in the drawing are illustrated such means, which are commonly used as a compressed air or fluid and a foot power brake. These means do not serve to apply the brake to the vehicle, but preferably to disengage same from braking.

The fluid power release consists of a cylinder 21, piston 22 and piston rod 23, the latter may be common with the brake rod as illustrated. The brake release cylinder or piston rod thereof may be attached to the brake mechanism of the vehicle, in a manner so as to act directly upon the brake drum, thus obviating the necessity of any connecting links between release cylinder and brake, which in turn enhances the safety of the brake system. The disengagement of the shoe from drum 20 is accomplished in this construction with compressed air or fluid permitted to flow through port 25 into the cylinder. This arrangement permits to attain the braking of a vehicle when the pressure of the fluid decreases or any means, which supplies or conveys the fluid, has failed to work properly.

A further brake disengagement mechanism is operated by foot power and consists of lever 27, pivotally secured in a bracket 28 to the frame of the vehicle and carrying a movable foot plate 26 at its upper arm. The plate, which is free to turn on pin 29, has an extending portion 30, which is movably connected by pin 31 to a slip-bar 32, serving to engage with the lock portion 33 into a ratchet upright 34, secured to the frame and preventing too great an effort of the driver in maintaining the brake disengaged.

The lower arm of foot lever 27 is in connection with brake lever 35 by the medium of a draw bar 36 and pins 37 and 38. Said lever 35 is pivoted at 39 to the frame and in connection with brake rod 14 by a pin 40 or in any other convenient manner.

Draw bar 36 is further extended to lever 41 by means of bar 42 and in connection with the same by pin 43. Pivoted at 44 to the frame and connected with arm 45 to brake 46, (which is oppositely arranged on the same brake drum at the wheel 4,) lever 41 serves to operate the brake simultaneous to the other brake mechanism. A projecting portion 47 of brake rod 14 is connected by pin 48 to bell crank lever 49, which is movably mounted to pivot 50. The other arm of bell crank lever 49 is connected at 51 to a brake 52, which is provided to act on the surface of the road.

A further draw bar 53 and the lever 54, which are connected together at 55 by a pin, serve to bring brake 56 in accordance with the previously described brakes. This brake mechanism is somewhat different from the preceding brake apparatus. In this construction spring 12, serves to contract a brake band 58 on the drum. The ends of the band 58 are attached by pins 59 and 60 to lever 54 and the brake rod 14 or the frame respectively.

An expansion of spring 12 causes a movement of the brake rod 14 and arm 61 of lever 54 toward the wheel 5, while the longer arm 55 of lever 54 swings outwardly from the drum on pivot 62, and causes the contraction of the band. Blocks 63 of suitable material, having a high coefficient of friction are attached to band 58.

A further feature of this invention is to connect the propelling power actuating means to the brake mechanism so as to switch off or disengage same, when brake is applied. For this purpose numeral 65 involves a clutch, which serves to transfer motion power from the engine (not illustrated) and shaft 66 to shaft 67 of the wheel mechanism, by means of the engagement of part 68 into part 69 of the clutch. Such engagement of the clutch is attained by lever 27, which is in connection with the clutch by a pin 70 projecting into a recess 71 of part 68.

The operation of the device is as follows: A downward movement of foot lever 27 engages the clutch members and permits the propelling of the vehicle; simultaneous to this movement the brake shoes are withdrawn from contact with the brake drum, and the brake springs thus repelled. A little turn of the foot plate 26 in the direction of the arrow engages the locking portion 33 of bar 32 into ratchet upright 34 and permits to maintain the vehicle propelled. But as soon as the driver withdraws his foot from the plate, spring 24 turns plate 26 backward which unlocks portion 33 from ratchet 34. Now, the brake springs 12 expand, causing the disengagement of the clutch by means of the levers and the applying of the brake to the vehicle.

Having fully described my invention, I claim as new and desire to secure by Letters Patent:—

1. In a vehicle, a driving means, a driven means and a clutch for connecting the same, a plurality of brakes and a lever operating said clutch and connected with said brakes, certain of said brakes being shoe brakes and levers controlling each of said shoe brakes.

2. In a vehicle, normally operated brakes and a starting mechanism, the operation of the latter releasing said brakes, a plurality of levers for controlling said brakes.

3. In a vehicle, normally operated brakes and a starting mechanism, the operation of the latter releasing said brakes, a plurality of levers for controlling said brakes, said brakes being normally under spring control.

4. A wheeled vehicle, a plurality of braking devices therefor, said devices being shoe, band, and surface brakes, and a common means for operating all of said brakes simultaneously, all of said brakes being spring controlled.

5. A wheeled vehicle, a plurality of braking devices therefor, said devices being shoe, band, and surface brakes, and a common means for operating all of said brakes simultaneously, all of said brakes being spring controlled, and normally in operation.

6. A wheeled vehicle, a plurality of braking devices therefor, said devices being shoe, band, and surface brakes, a common means for operating all of said brakes simultaneously, all of said brakes being spring controlled, and normally in operation, and means for throwing said brakes out of operation.

7. A wheeled vehicle, a plurality of braking devices therefor, said devices being shoe, band, and surface brakes, a common means for operating all of said brakes simultaneously, all of said brakes being spring controlled, and normally in operation, means for throwing said brakes out of operation and a driving means for said vehicle connected with said first means.

8. A wheeled vehicle, a plurality of braking devices therefor, said devices being shoe, band, and surface brakes, a common means for operating all of said brakes simultaneously, all of said brakes being spring controlled, and normally in operation, means for throwing said brakes out of operation, and a driven means for said vehicle connected with said first means, whereby the releasing of said brakes will cause the operation of said driven means.

9. A wheeled vehicle, a plurality of braking devices therefor, said devices being shoe, band, and surface brakes, a common means for operating all of said brakes simultaneously, all of said brakes being spring controlled, and normally in operation, means for throwing said brakes out of operation, a driven means for said vehicle connected with said first means, whereby the releasing of said brakes will cause the operation of said driven means, and whereby the stopping of said driven means will set said brakes.

10. A wheeled vehicle, a plurality of braking devices therefor, said devices being shoe, band, and surface brakes, a common means for operating all of said brakes simultaneously, all of said brakes being spring controlled, and normally in operation, means for throwing said brakes out of operation, a driven means for said vehicle connected with said first means, whereby the releasing of said brakes will cause the operation of said driven means, and whereby the stopping of said driven means will set said brakes, said band brake being directly connected with one of said shoe brakes.

11. A wheeled vehicle, a plurality of braking devices therefor, said devices being shoe, band, and surface brakes, a common means for operating all of said brakes simultaneously, all of said brakes being spring controlled, and normally in operation means for throwing said brakes out of operation, a driven means for said vehicle connected with said first means, whereby the releasing of said brakes will cause the operation of said driven means and whereby the stopping of said driven means will set said brakes, said band brake being directly connected with one of said shoe brakes, and a common lever for operating both of said last brakes.

12. A wheeled vehicle, a plurality of braking devices therefor, said devices being shoe, band, and surface brakes, a common means for operating all of said brakes simultaneously, all of said brakes being spring controlled, and normally in operation, a driven means for said vehicle connected with said means, whereby the releasing of said brakes will cause the operation of said driven means, and whereby the stopping of said driven means will set said shoe brakes, said band brakes being controlled by the spring control of one of said shoe brakes, said surface brake being actuated through one of said shoe brakes.

13. A wheeled vehicle, a plurality of braking devices therefor, said devices being shoe, band, and surface brakes, a common means for operating all of said brakes simultaneously, all of said brakes being spring controlled, and normally in operation, means for throwing said brakes out of operation, a driven means for said vehicle connected with said first means, whereby the releasing of said brakes will cause the operation of said driven means, and whereby the stopping of said driven means will set said shoe brakes, said band brakes being controlled by the spring control of one of said shoe brakes, said surface brake being actuated through one of said shoe brakes, a bell-crank lever connecting said last two brakes.

14. In a vehicle, normally operated brakes and a starting mechanism, the operation of the latter releasing said brakes, a plurality of levers for controlling said brakes, said brakes being normally under spring control and a band brake, one of said levers adapted to control said band brake.

15. In a vehicle, a driving means, a driven means and a clutch for connecting the same, a plurality of brakes and a lever operating said clutch and connected with said brakes, certain of said brakes being shoe brakes and levers controlling each of said shoe brakes and rods connecting said levers with said lever.

16. In a vehicle, a driving means, a driven means and a clutch for connecting the same, a plurality of brakes and a lever operating said clutch and connected with said brakes, certain of said brakes being shoe brakes and levers controlling each of said shoe brakes, rods connecting said levers with said lever and a surface brake operated through one of said shoe brakes.

17. In a wheeled vehicle, a driven means therefor, shoe, band, and surface brakes therefor, and means whereby said brakes and means are simultaneously operated, whereby the brakes are thrown out of operation as said driven means is started, and whereby said brakes are thrown into operation as said driven means is stopped.

18. In a vehicle, a driving means, a driven means and a clutch for connecting the same, a plurality of brakes and a lever operating said clutch and connected with said brakes, certain of said brakes being shoe brakes and levers controlling each of said shoe brakes, rods connecting said levers with said lever, a surface brake operated through one of said shoe brakes and a band brake operated through one of said shoe brakes.

19. In a wheeled vehicle, a driven means therefor, brakes therefor, link and lever connecting means therefor and springs, the latter normally actuating said brakes and controlling the operation of said driven means, whereby said means and brakes must remain under manual control in order that said vehicle may operate, said brakes embracing shoe, band, and surface engaging brakes, all of said brakes being spring controlled.

20. In a wheeled vehicle, a driven means therefor, brakes therefor, link and lever connecting means therefor and springs, the latter normally actuating said brakes and controlling the operation of said driven means, whereby said means and brakes must remain under manual control in order that said vehicle may operate, said brakes embracing shoe, band, and surface engaging brakes, all of said brakes being spring controlled, certain of said brakes being spring pressed, said band being actuated by one of said shoe brakes.

21. In a vehicle, a driving means, a driven means and a clutch for connecting the same, a plurality of brakes and a lever operating said clutch and connected with said brakes, certain of said brakes being shoe brakes and levers controlling each of said shoe brakes, rods connecting said levers with said lever, a surface brake operated through one of said shoe brakes, a band brake operated by another of said shoe brakes, a fluid control for one of said shoe brakes whereby all of said brakes may be controlled.

22. In a vehicle, a driving means, a driven means and a clutch for connecting the same, a plurality of brakes and a lever operating said clutch and connected with said brakes, certain of said brakes being shoe brakes and levers controlling each of said shoe brakes, rods connecting said levers with said lever, a surface brake operated through one of said shoe brakes, a band brake operated by another of said shoe brakes, a fluid control for one of said shoe brakes whereby all of said brakes may be controlled and the action of said brakes being simultaneous.

23. In a vehicle a normally operating braking system and a driven mechanism, a clutch for controlling said driven mechanism, means for controlling said clutch and braking system, said system being coöperated by said clutch to release said brakes as said mechanism is started, levers for controlling said brakes, springs for pressing each of said brakes.

24. In a vehicle a normally operating braking system and a driven mechanism, a clutch for controlling said driven mechanism, means for controlling said clutch and braking system, said system being coöperated by said clutch, to release said brakes as said mechanism is started, levers for controlling said brakes, springs for normally continually holding said brakes in operation while said vehicle is at rest, and an independent means for controlling said brakes.

25. In a vehicle a normally operating braking system and a driven mechanism, a clutch for controlling said driven mechanism, means for controlling said clutch and braking system, said system being coöperated by said clutch to release said brakes as said mechanism is started, levers for controlling said brakes, springs for normally continually holding said brakes in operation while said vehicle is at rest and an independent means for controlling said brakes, said last means being air actuated.

26. A brake system consisting of a plurality of spring pressed shoe brakes, horizontally movable rods upon which each of said brakes is mounted, separate levers for releasing each of said brakes, links connecting said levers, a track brake operated by one of said rods.

27. A brake system consisting of a plurality of spring pressed shoe brakes, horizontally movable rods upon which each of said brakes is mounted, separate levers for releasing each of said brakes, links connecting said levers, a track brake operated by one of said rods, a band brake operated by one of said levers.

28. A brake system consisting of a plurality of spring pressed shoe brakes, horizontally movable rods upon which each of said brakes is mounted, separate levers for releasing each of said brakes, links connecting said levers, a track brake operated by one of said rods, a band brake operated by one of said levers, a control lever for all of said other levers.

29. A brake system consisting of a plurality of spring pressed shoe brakes, horizontally movable rods upon which each of said brakes is mounted, separate levers for releasing each of said brakes, links connecting said levers, a track brake operated by one of said rods, a band brake operated by one of said levers, a control lever for all of said other levers, means whereby one of said rods may control all of said brakes.

30. A brake system consisting of a plurality of spring pressed shoe brakes, horizontally movable rods upon which each of said brakes is mounted, separate levers for releasing each of said brakes, links connecting said levers, a track brake operated by one of said rods, a band brake operated by one of said levers, a control lever for all of said other levers, means whereby one of said rods may control all of said brakes, said means being air controlled.

31. A brake system consisting of a plurality of spring pressed shoe brakes, horizontally movable rods upon which each of said brakes is mounted, separate levers for releasing each of said brakes, links connecting said levers, a track brake operated by one of said rods, a band brake operated by one of said levers, a control lever for all of said other levers, means whereby one of said rods may control all of said brakes, said means being air controlled, in combination with a driven mechanism adapted to be operated by said control lever.

32. A brake system consisting of a plurality of spring pressed shoe brakes, horizontally movable rods upon which each of said brakes is mounted, separate levers for releasing each of said brakes, links connecting said levers, a track brake operated by one of said rods, a band brake operated by one of said levers, a control lever for all of said other levers, means whereby one of said rods may control all of said brakes, said means being an air controlled lever, in combination with a driven mechanism adapted to be operated by said control lever, whereby the stopping of said mechanism will set said brakes.

33. A brake system consisting of a plurality of spring pressed shoe brakes, horizontally movable rods upon which each of said brakes is mounted, separate levers for releasing each of said brakes, links connecting said levers, a track brake operated by one of said rods, a band brake operated by one of said levers, means whereby one of said rods may control all of said brakes, said means being an air controlled lever, in combination with a driven mechanism, whereby the stopping of said mechanism will set said brakes, and whereby the releasing of said brakes will start said mechanism.

34. A brake system consisting of a plurality of spring pressed shoe brakes, horizontally movable rods upon which each of said brakes is mounted, separate levers for releasing each of said brakes, links connecting said levers, a track brake operated by one of said rods, a band brake operated by one of said levers, means whereby one of said rods may control all of said brakes, said means being an air controlled lever, in combination with a driven mechanism, whereby the stopping of said mechanism will set said brakes, and whereby the releasing of said brakes will start said mechanism, and means for holding said brakes inoperative.

35. In a vehicle, a plurality of brakes therefor, a driving means and a driven means therefor, a fluid control and a manual control for said brakes and means for connecting the driving and driven means, said connecting means being operable by either of said controls.

36. In a vehicle, a plurality of brakes therefor, a driving means and a driven means therefor, a fluid control and a manual control for said brakes and means for connecting the driving and driven means, said connecting means being operable by either of said controls and links for connecting all of said brakes.

37. In a vehicle, a plurality of brakes therefor, a driving means and a driven means therefor, a fluid control and a manual control for said brakes and means for connecting the driving and driven means, said connecting means being operable by either of said controls, links for connecting all of said brakes with said connecting means.

38. In a vehicle, a plurality of brakes therefor, a driving means and a driven means therefor, a fluid control and a manual control for said brakes and means for connecting the driving and driven means, said connecting means being operable by either of said controls, links for connecting all of said brakes with said connecting means, said last means being a foot operated clutch.

39. In a vehicle, a frame, wheels, a shoe brake and a pivotally suspended link from said frame supporting said brake, a fluid controlled piston directly connected to said brake and a manually controlled lever connected with said brake through said link.

40. In a vehicle, a frame, wheels, a shoe brake and a pivotally suspended link from said frame supporting said brake, a fluid controlled piston directly connected to said brake, a manually controlled lever connected with said brake through said link and an opposing shoe brake operable through said link.

41. In a vehicle, a frame, wheels, a shoe brake and a pivotally suspended link from said frame supporting said brake, a fluid controlled piston connected with said brake, a manually controlled lever connected with said brake through said link, an opposing shoe brake operable through said link and a surface brake controlled through said last brake.

42. In a vehicle, the combination, of driving means, driven means and brakes, levers, links and a clutch for connecting said driving and driven means for propelling of said vehicle and for operating said brakes, said brakes being spring controlled, a ratchet for manually locking said clutch and brakes and springs for automatically unlocking said locking ratchet, adapted to permit operation of said brakes by said brake springs if the same are not kept manually in operative condition for the operation of said vehicle.

43. In a vehicle, a shoe brake and a band brake operable through said shoe brake, said brakes being normally operating, means for controlling said brakes and a driven means controlled by said last means whereby the operation of said brakes and driven means is simultaneous.

44. In a vehicle, a shoe brake and a band brake operable through said shoe brake, said brakes being normally operating, means for controlling said brakes and a driven means controlled by said last means whereby the operation of said brakes and driven means is simultaneous and a plurality of other simultaneously operable brakes controlled by said means, all of said brakes being spring pressed.

In witness whereof I hereunto subscribe my name.

AUGUST J. KLONECK.

Witnesses:
FRIEDRICH SCHERZER,
ERNST BOETTCHER.